US011986938B2

(12) United States Patent
Wu et al.

(10) Patent No.: US 11,986,938 B2
(45) Date of Patent: May 21, 2024

(54) ELECTRIC NAIL GUN

(71) Applicant: BASSO INDUSTRY CORP., Taichung (TW)

(72) Inventors: Jian-Rung Wu, Taichung (TW); Rui-Wen Wu, Taichung (TW)

(73) Assignee: Basso Industry Corp., Taichung (TW)

( * ) Notice: Subject to any disclaimer, the term of this patent is extended or adjusted under 35 U.S.C. 154(b) by 0 days.

(21) Appl. No.: 18/088,015

(22) Filed: Dec. 23, 2022

(65) Prior Publication Data

US 2023/0202010 A1 Jun. 29, 2023

(30) Foreign Application Priority Data

Dec. 28, 2021 (TW) ................................ 110215534

(51) Int. Cl.
*B25C 1/04* (2006.01)

(52) U.S. Cl.
CPC .............. *B25C 1/045* (2013.01); *B25C 1/047* (2013.01)

(58) Field of Classification Search
CPC ........... B25C 1/045; B25C 1/047; B25C 1/04; B25C 1/041; B25C 1/043; B25C 1/06; B25C 1/008; B25C 1/042
See application file for complete search history.

(56) References Cited

U.S. PATENT DOCUMENTS

2015/0197001 A1 7/2015 Li
2016/0151900 A1 6/2016 Wu et al.
2018/0290279 A1* 10/2018 Kobori .................... B25C 1/047
2021/0237242 A1 8/2021 Kyocera
2023/0071613 A1* 3/2023 Akiba ..................... B25C 1/042

FOREIGN PATENT DOCUMENTS

EP 1366863 A2 12/2003
EP 3321037 A1 5/2018
WO 2011010511 A1 1/2011
WO 2021192838 A1 9/2021

OTHER PUBLICATIONS

Search Report issued to European counterpart application No. 22216510.2 by the EPO dated Jun. 19, 2023.

* cited by examiner

*Primary Examiner* — Veronica Martin
(74) *Attorney, Agent, or Firm* — Burris Law, PLLC

(57) ABSTRACT

An electric nail gun includes a cylinder unit, a nail-striking unit and a valve unit. The cylinder unit includes a striking cylinder that surrounds a first axis and that defines a cylinder chamber, and a cylinder lid that cooperates with the striking cylinder to define a gas storing chamber communicating with the cylinder chamber. The cylinder lid includes a passage that communicates with the gas storing chamber, and that extends along a second axis. The nail-striking unit includes a piston assembly that is adapted for striking a nail. The valve unit includes a valve assembly that is accommodated in the passage. The valve assembly is operable to convert between a first state, in which the gas is allowed to flow between the gas storing chamber and an external environment through the passage, and a second state, in which the gas is refrained from flowing through the passage.

3 Claims, 7 Drawing Sheets

ELECTRIC NAIL GUN

CROSS-REFERENCE TO RELATED APPLICATION

This application claims priority to Taiwanese Utility Model Patent Application No. 110215534, filed on Dec. 28, 2021.

FIELD

The disclosure relates to an electric nail gun, and more particularly to an electric nail gun capable of storing gas under a predetermined air pressure.

BACKGROUND

Referring to FIG. 1, a conventional electric nail gun 1 disclosed in U.S. Patent Publication No. 20210237242 includes a cylinder wall 11, an outer wall 12, an end lid 13, a driving unit 14 and a gas-filling valve 15. The end lid 13 cooperates with the cylinder wall 11 and the outer wall 12 to define a pressure chamber 10. The driving unit 14 is located in the cylinder wall 11 and is movable relative to the cylinder wall 11 along an axis (Z). The pressure chamber 10 stores gas under a predetermined air pressure, and is capable of urging the driving unit 14 to perform nail striking after the cylinder wall 11 receives the gas from the pressure chamber 10. The end lid 13 has a sidewall 133, a valve hole 131 that is formed in the sidewall 133 and that extends in a direction of the axis (Z), and a passage 132 that is formed in the sidewall 133 and that communicates with the valve hole 131 and the pressure chamber 10. The gas-filling valve 15 is mounted to the valve hole 131, extends into the valve hole 131 in the direction of the axis (Z), and is adapted to be connected to a gas-filling system when the air pressure in the pressure chamber 10 is lower than the predetermined air pressure so that the gas may be guided by the gas-filling valve 15 to flow from the gas-filling system into the pressure chamber 10 through the passage 132, thereby increasing the air pressure in the pressure chamber 10.

However, because the gas-filling valve 15 that extends into the valve hole 131 of the end lid 13 in the direction of the axis (Z) has a certain length and a certain width, the sidewall 133 of the end lid 13 must have a length and a width that are long enough to accommodate the gas-filling valve 15. In addition, because the valve hole 131 and the passage 132 are formed in the sidewall 133, the structural integrity of the sidewall 133 may be decreased. Consequently, the end lid 13 may have poor structural strength, and the manufacturing cost thereof may be relatively high. The structural strength of the end lid 13 may only be improved by increasing the thickness and the length of the sidewall 133, which would make the sidewall 133 thick and heavy.

SUMMARY

Therefore, an object of the disclosure is to provide an electric nail gun that can alleviate at least one of the drawbacks of the prior art.

According to the disclosure, the electric nail gun includes a cylinder unit, a nail-striking unit and a valve unit. The cylinder unit includes a striking cylinder that surrounds a first axis and that defines a cylinder chamber, and a cylinder lid that cooperates with the striking cylinder to define a gas storing chamber. The gas storing chamber is adapted for storing gas, and communicates with the cylinder chamber.

The cylinder lid includes a passage that communicates with the gas storing chamber. The passage extends along a second axis and is at least partially surrounded by the gas storing chamber. The second axis is substantially orthogonal to the first axis. The nail-striking unit includes a piston assembly that extends through the cylinder chamber, that is movable along the first axis, and that is adapted for striking a nail. The piston assembly is able to be driven by pneumatic power and electric power. The gas storing chamber is isolated from an external environment when the nail-striking unit strikes the nail. The valve unit includes a valve assembly that is accommodated in the passage. The valve assembly is operable to convert between a first state, in which the gas is allowed to flow between the gas storing chamber and the external environment through the passage, and a second state, in which the gas is refrained from flowing through the passage.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
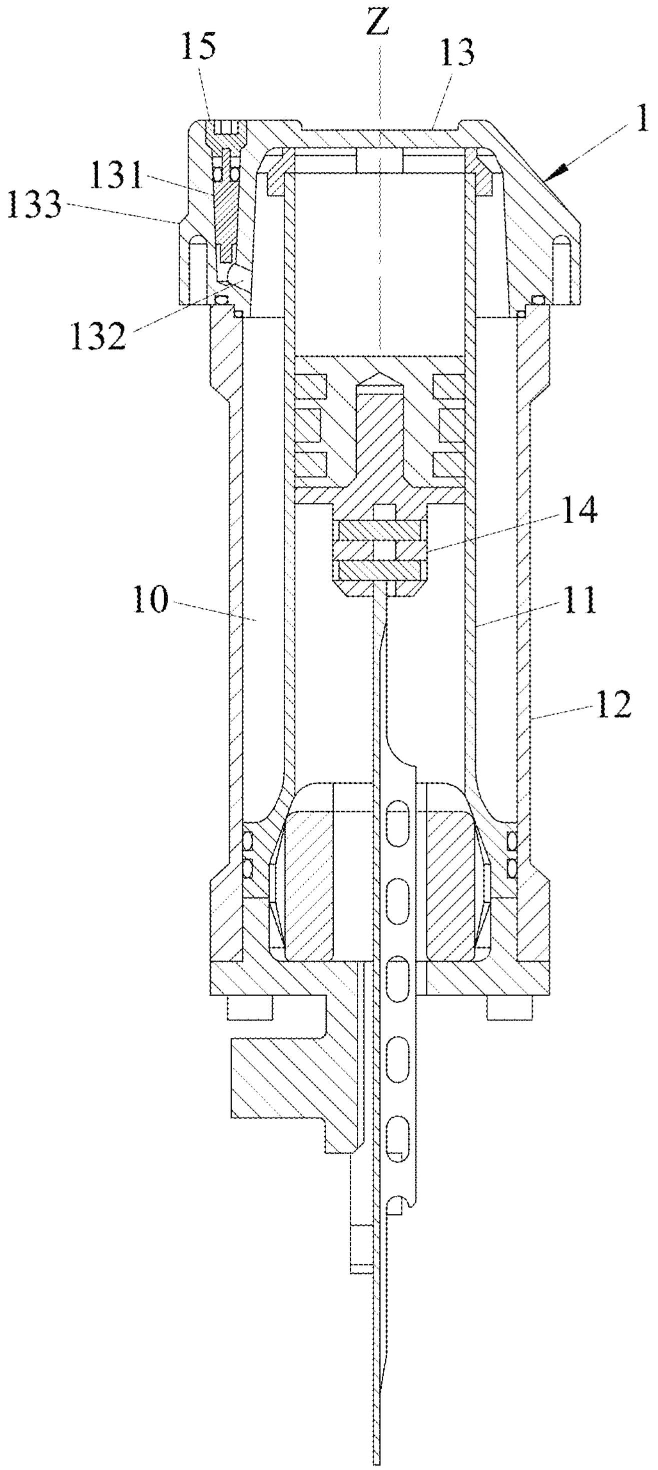
FIG.1 PRIOR ART
FIG. 1 is a sectional view of a conventional electric nail gun disclosed in U.S. Patent Publication No. 20210237242.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
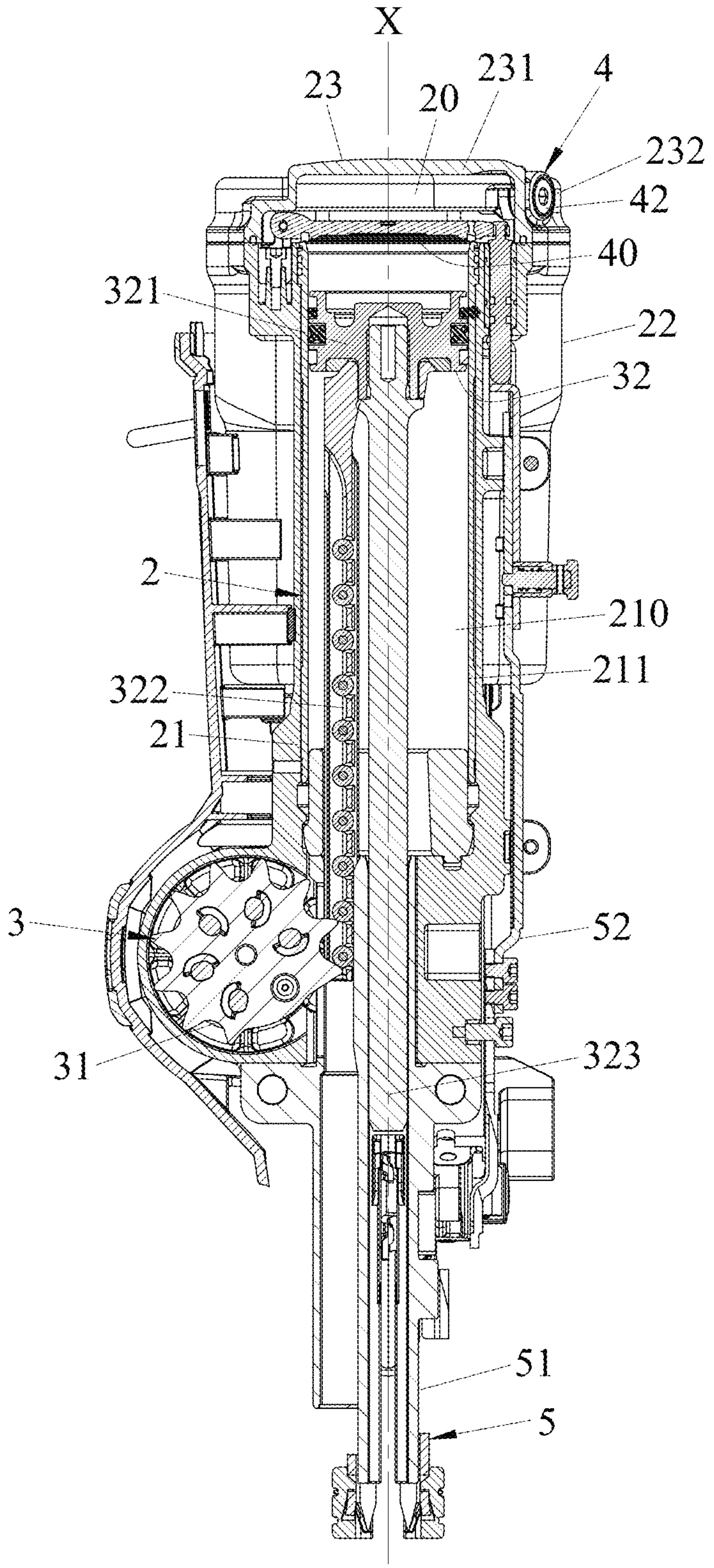
FIG. 2 is a sectional view of an embodiment of an electric nail gun according to the disclosure.
Figure 3:
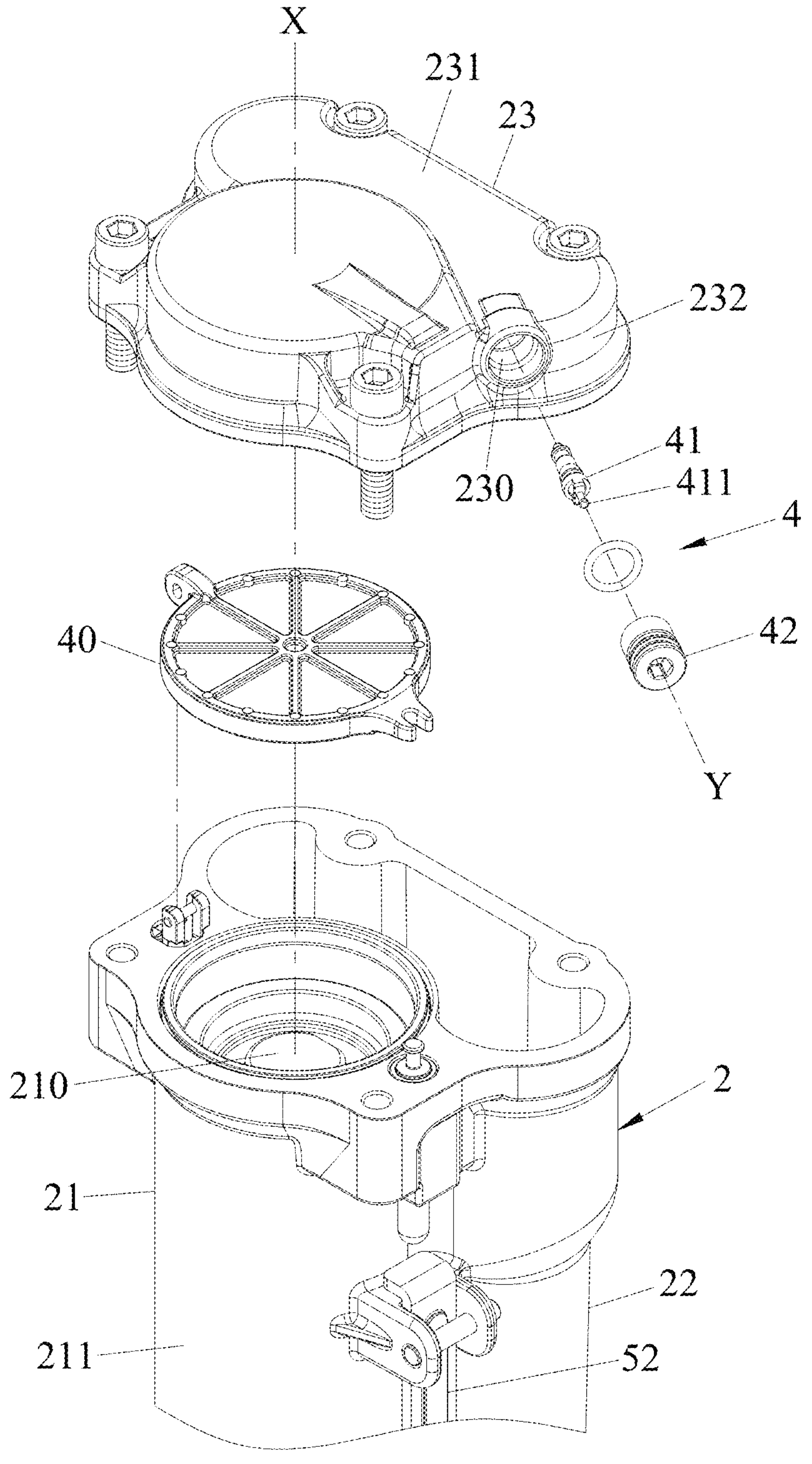
FIG. 3 is a fragmentary, partly exploded perspective view of the embodiment.
Figure 4:
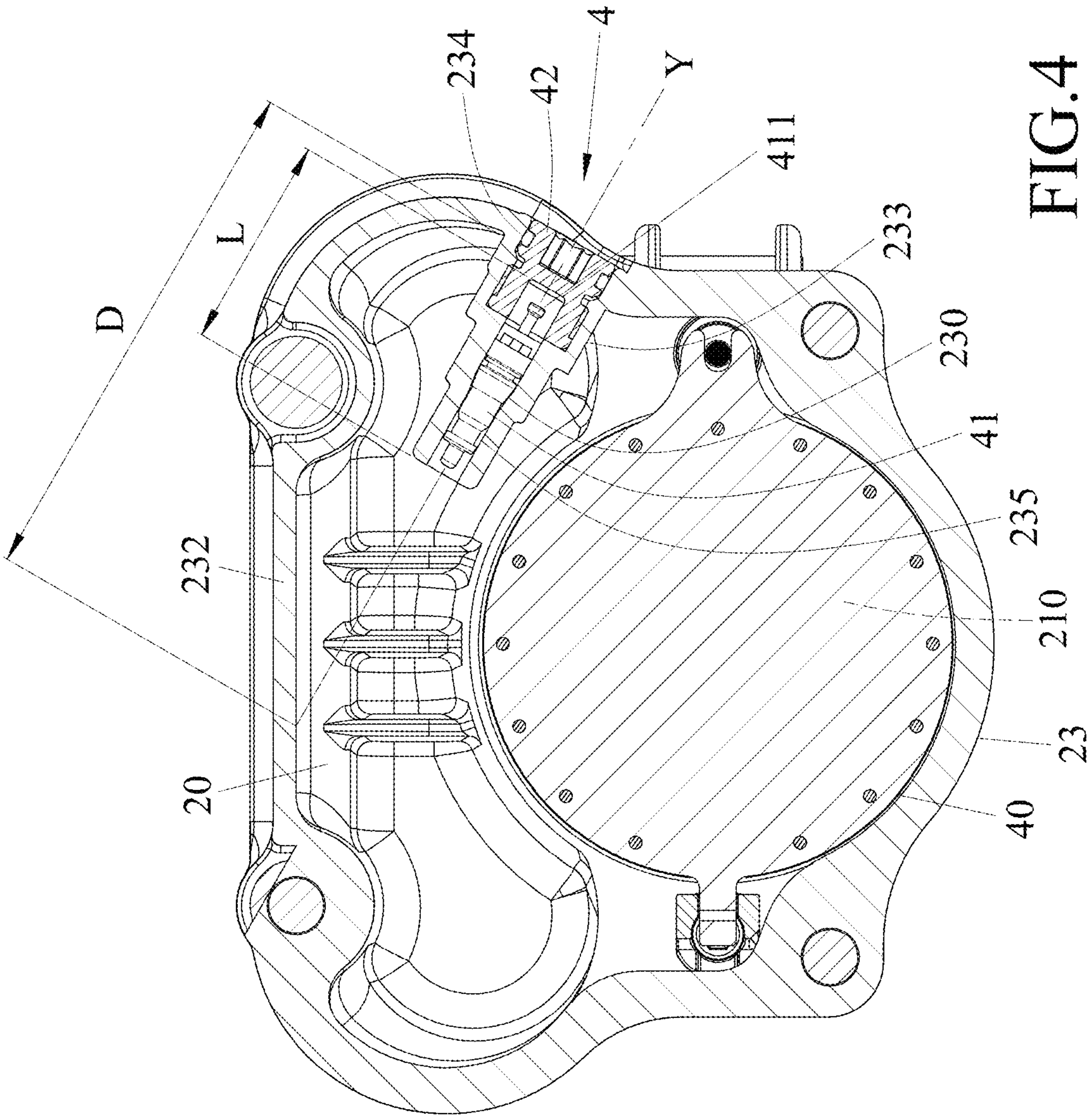
FIG. 4 is an enlarged sectional view of the embodiment.

Referring to FIGS. 2, 3, and 4, an embodiment of an electric nail gun according to the disclosure includes a cylinder unit 2, a valve unit 4, a muzzle unit 5, and a nail-striking unit 3 that is adapted for a striking a nail (not shown).

The cylinder unit 2 includes a striking cylinder 21, a storage cylinder 22, and a cylinder lid 23 that cooperates with the striking cylinder 21 and the storage cylinder 22 to define a gas storing chamber 20. The gas storing chamber 20 is adapted for storing gas under a predetermined air pressure.

The striking cylinder 21 has a cylinder body 211 that surrounds a first axis (X) and that defines a cylinder chamber 210.

Figure 5:
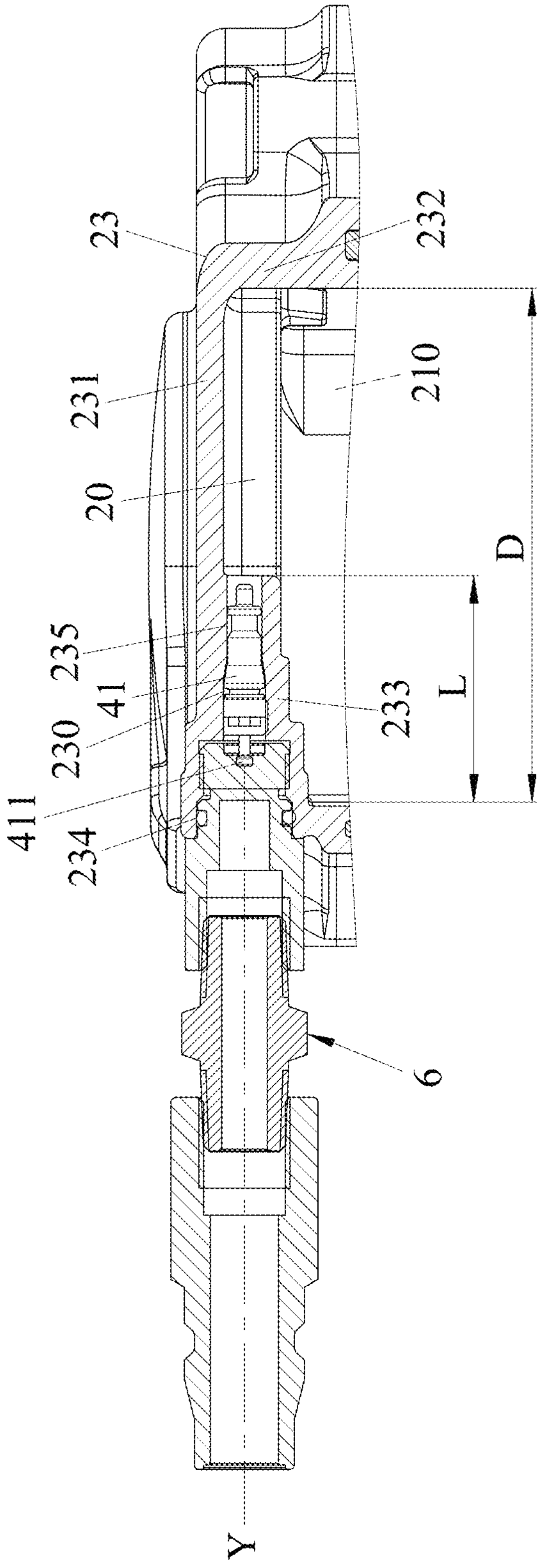
FIG. 5 is a fragmentary sectional view of the embodiment.

Referring further to FIG. 5, the cylinder lid 23 has a lid wall 231 that is spaced apart from the striking cylinder 21 in an extending direction of the first axis (X), a surrounding wall 232 that is connected to the lid wall 231 and that surrounds the first axis (X), and a passage-defining portion 233 that is formed between the lid wall 231 and the surrounding wall 232, that surrounds a second axis (Y), and that defines a passage 230. The passage 230 communicates with the gas storing chamber 20. The second axis (Y) is substantially orthogonal to the first axis (X).

The gas storing chamber 20 has a width (D) along the second axis (Y).

In this embodiment, the passage-defining portion 233 extends from the surrounding wall 232 along the second axis (Y), and defines the passage 230 therein such that the passage 230 extends from the surrounding wall 232 along the second axis (Y). The passage-defining portion 233 has a length (L) along the second axis (Y), and the length (L) is less than half of the width (D) of the gas storing chamber 20. It is noted that, in certain embodiments, the length (L) may be larger than half of the width (D), as long as the length (L) is less than the width (D). The passage 230 has a first hole section 234 that is adjacent to an external environment and that is connected to the surrounding wall 232, and a second hole section 235 that is located at one side of the first hole section 234 opposite to the external environment and that is surrounded by the gas storing chamber 20. In one embodiment, the passage 230 has a portion that is not formed in the surrounding wall 232.

Referring to FIGS. 2 and 3 again, the nail-striking unit 3 includes a lifting gear 31 that is rotatably mounted between the cylinder unit 2 and the muzzle unit 5, and that is able to be driven by electric power (e.g. an electric motor), and a piston assembly 32 that extends through the cylinder chamber 210, that is movable along the first axis (X), and that is adapted for striking the nail. The piston assembly 32 is able to be driven by pneumatic power and electric power. The piston assembly 32 includes a piston 321 that abuts against an inner surface of the striking cylinder 21 airtightly, and a lifting rod 322 and a firing pin 323 that are connected to the piston 321.

The valve unit 4 includes a switch valve 40, a valve assembly 41 that is accommodated in the passage 230, and a valve lid 42. The valve assembly 41 is operable to convert between a first state, in which the gas is allowed to flow between the gas storing chamber 20 and the external environment through the passage 230, and a second state, in which the gas is refrained from flowing through the passage 230.

Figure 6:
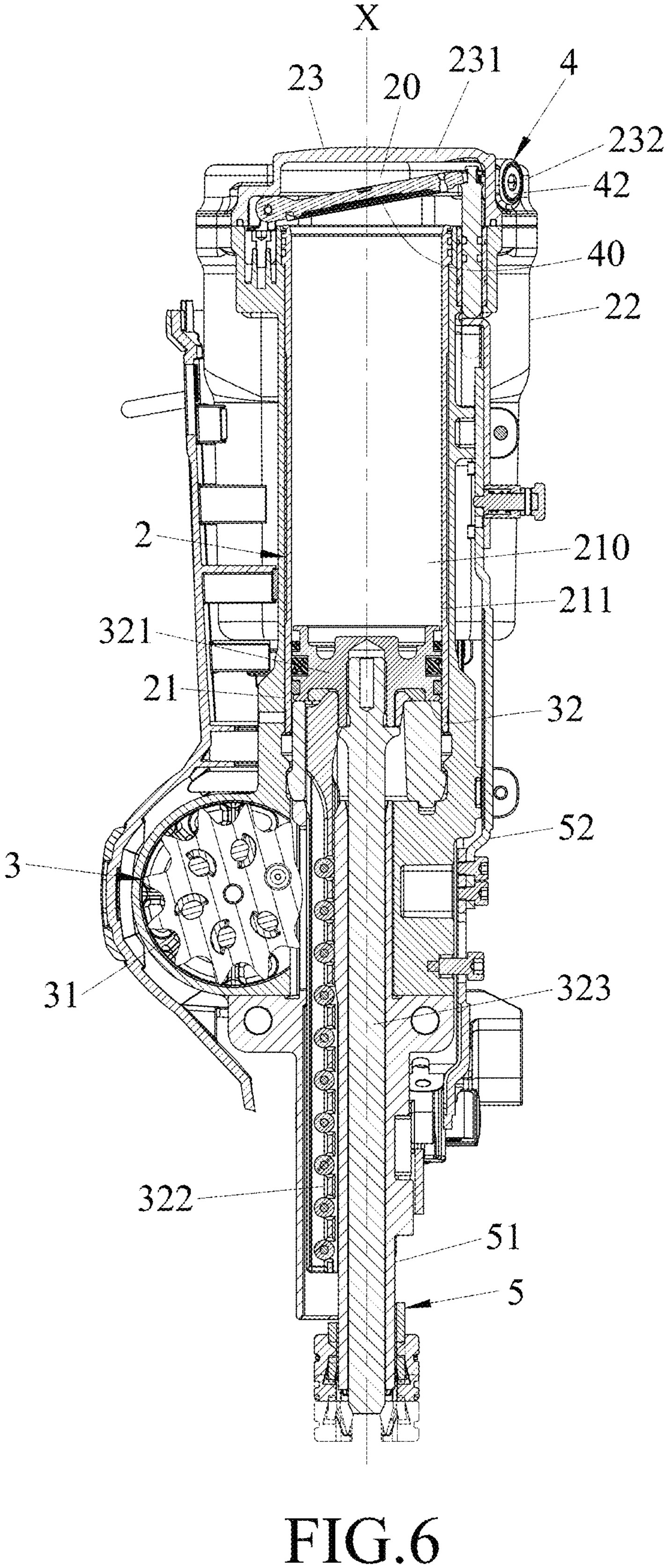
FIG. 6 is a view similar to FIG. 2 but illustrating a nail-striking unit of the embodiment striking a nail.

The switch valve 40 is rotatably mounted to the cylinder unit 2, is located between the cylinder chamber 210 and the gas storing chamber 20, and is operable to move between an open position (see FIG. 6), in which the gas storing chamber 20 communicates with the cylinder chamber 210, and a closed position (see FIG. 2), in which the gas in the gas storing chamber 20 is refrained from entering the cylinder chamber 210.

Referring to FIGS. 4 and 5 again, in this embodiment, the valve assembly 41 is a flow control valve that is readily available on the market, is mounted to the second hole section 235 of the passage 230, and has a valve rod 411 that is movable in an extending direction of the second axis (Y). The valve rod 411 is operable to be connected to a nozzle 6 of a gas-filling system. When there is no external force exerted on the valve rod 411 (i.e., the valve assembly 41 is in the second state), the gas is refrained from passing through the passage 230 by the valve rod 411. When the valve rod 411 is connected to the nozzle 6 and is pressed or pushed by the nozzle 6 (i.e., the valve assembly 41 is in the first state), the gas provided by the gas-filling system is allowed to flow through the passage 230 by the valve rod 411 such that the gas enters the gas storing chamber 20. Since details of the valve assembly 41 may be deduced from the description above by those skilled in the art, no further details describing the valve assembly 41 will be provided.

The valve lid 42 is removably mounted to the first hole section 234. When the valve lid 42 is mounted to the first hole section 234, the valve lid 42 closes the passage 230 so that the passage 230 is isolated from the external environment. When the valve lid 42 is removed from the first hole section 234, the first hole section 234 is adapted to be connected to the nozzle 6 so that the valve assembly 41 mounted to the second hole section 235 may be connected to the nozzle 6 and that the gas is allowed to pass through the passage 230 when the valve assembly 41 is pushed by the nozzle 6.

Referring to FIGS. 2 and 3 again, the muzzle unit 5 includes a nail gun seat 51 that is connected to the cylinder unit 2 and that is adapted for loading nails (not shown), and a safety assembly 52 that substantially extends in the extending direction of the first axis (X), that is mounted to the nail gun seat 51, that is movable relative to the nail gun seat 51 in the extending direction of the first axis (X), and that is capable of urging the switch valve 40 to move to the open position.

For the sake of convenience, referring to FIGS. 2 and 6 again, the nail gun seat 51 and the cylinder lid 23 are respectively defined as lower and upper sections of the electric nail gun, and the lifting gear 31 is defined as a left section of the electric nail gun (i.e., the safety assembly 52 is substantially located at a right section of the electric nail gun).

When the electric nail gun is in an initial state (see FIG. 2), the piston 321 is located at an upper side of the striking cylinder 21 and is close to the cylinder lid 23, and the gas storing chamber 20 stores the gas under the predetermined air pressure. At this time, the switch valve 40 is in the closed position, and the lifting gear 31 meshes with the lifting rod 322.

Referring to FIG. 6 again, when a user operates the electric nail gun to strike the nail into an object (not shown), the safety assembly 52 abuts against the object, and then the user urges the electric nail gun to move toward the object such that the safety assembly 52 moves upwardly along the first axis (X) and urges the switch valve 40 to be in the open position. Consequently, the gas in the gas storing chamber 20 enters the cylinder chamber 210 and presses against the piston 321. At this time, when the lifting gear 31 is driven by the electric power to rotate, the lifting gear 31 is separated from the lifting rod 322 such that the lifting rod 322 is not limited by the electric power, and the piston 321 is thus pushed downwardly by the gas that enters the cylinder chamber 210. During downward movement of the piston 321, the piston 321 urges the firing pin 323 to slide relative to the nail gun seat 51 along the first axis (X), thereby striking the nail.

It is noted that, the gas storing chamber 20 is isolated from the external environment when the nail-striking unit 3 strikes the nail. Specifically, the gas storing chamber 20 does not spatially communicate with the external environment during nail-striking (i.e., from the moment that the lifting gear 31 is driven by electric power to be separated from the lifting rod 322 to the moment that the nail is struck). In fact, the gas storing chamber 20 may only spatially communicate with the external environment, or be connected to the gas-filling system, when the air pressure in the gas storing chamber 20 is smaller than the predetermined air pressure so that the gas storing chamber 20 may be refilled with the gas to increase the air pressure therein.

After the nail is struck, the lifting gear 31 is driven by the electric power to keep rotating such that the lifting gear 31 meshes with the lifting rod 322 again. At this time, by virtue of the lifting gear 31 meshing with the lifting rod 322, the electric power drives the lifting gear 31 to urge the lifting rod 322 to move upwardly such that the piston 321 and the firing pin 323 connected to the piston 321 are pushed upwardly by the lifting rod 322 (see FIG. 6 and FIG. 2 sequentially). During upward movement of the piston 321, the gas in the cylinder chamber 210 is compressed by the piston 321 such that the air pressure in the cylinder chamber 210 increases, and the gas in the cylinder chamber 210 is urged by the piston 321 to enter the gas storing chamber 20. In short, the electric power drives the piston assembly 32 to move upwardly such that the air pressure in the gas storing chamber 20 is increased, and the pneumatic power drives the piston assembly 32 to move downwardly so that the process of nail-striking may be completed.

Referring to FIGS. 2, 4, and 5 again, when the air pressure in the gas storing chamber 20 is insufficient, the gas in the gas storing chamber 20 has to be replenished. At this time, the user may simply remove the valve lid 42 from the first hole section 234, and then connect the valve rod 411 of the valve assembly 41 to the nozzle 6 of the gas-filling system. Afterwards, when the user presses the valve rod 411 via the nozzle 6, the gas will first be released from the gas-filling system, and pass through the nozzle 6 and the valve rod 411 before entering the gas storing chamber 20, thereby achieving the purpose of filling the gas.

On the other hand, when the user wants to discharge the gas in the gas storing chamber 20, the user may simply remove the valve lid 42 from the first hole section 234 and then press the valve rod 411 to discharge the gas from the gas storing chamber 20 to the external environment through the valve rod 411. The purpose of discharging the gas is thus achieved.

Figure 7:
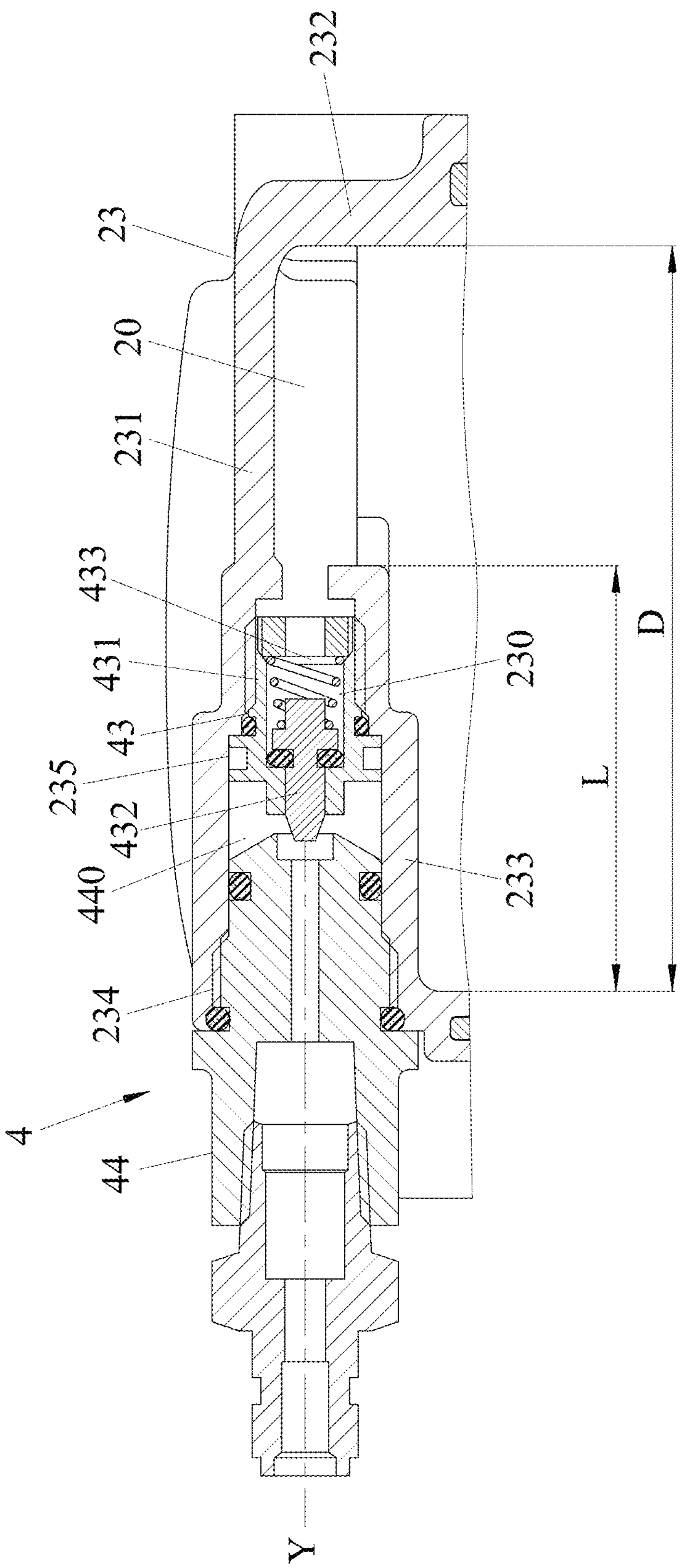
FIG. 7 is a fragmentary sectional view illustrating a modification of a valve unit of the embodiment.

It should be noted that, the valve unit 4 may not be limited to a flow control valve that is readily available on the market. In one modification of the embodiment, as shown in FIG. 7, the valve unit 4 may include a valve assembly 43 and a fitting member 44.

The valve assembly 43 includes a valve seat 431 that is mounted to the second hole section 235, a valve rod 432 that extends through the valve seat 431 and that is movable relative to the valve seat 431 in the extending direction of the second axis (Y), and a resilient member 433 that is disposed between the valve seat 431 and the valve rod 432. The valve rod 432 is operable to move in the extending direction of the second axis (Y) direction between a first position, in which the gas is refrained from passing through the passage 230, and a second position, in which the gas is allowed to pass through the passage 230. The resilient member 433 constantly and resiliently biases the valve rod 432 to the first position such that when there is no external force exerted on the valve rod 432, the gas is refrained from passing through the passage 230 by the valve rod 432.

The fitting member 44 is connected to the first hole section 234, is spaced apart from the valve assembly 43 along the second axis (Y), and cooperates with the valve assembly 43 to define a pressure chamber 440. The fitting member 44 is adapted to be connected to another gas-filling system, and is capable of guiding gas, which is provided by the gas-filling system, into the pressure chamber 440 so that the valve rod 432 is urged by air pressure in the pressure chamber 440 to allow the gas in the pressure chamber 440 to enter the gas storing chamber 20 through the passage 230.

In summary, the embodiments of the electric nail gun offer several benefits as follows.

Because the passage 230 is defined by the passage-defining portion 233 that extends from the surrounding wall 232 along the second axis (Y) rather than being formed in the surrounding wall 232, the thickness of the surrounding wall 232 of the cylinder lid 23 may be relatively small while the surrounding wall 232 may have sufficient structural strength, and the structural integrity of the cylinder lid 23 may be maintained. Therefore, the overall structural strength of the cylinder lid 23 is greatly improved.

By virtue of the length (L) of the passage-defining portion 233 along the second axis (Y) being smaller than the width (D) of the gas storing chamber 20 along the second axis (Y), the passage-defining portion 233 is accommodated in the gas storing chamber 20 so that a distance between the cylinder lid 23 and the striking cylinder 21 along the first axis (X) may not need to be increased, that the thickness of the surrounding wall 232 may not need to be increased, and that no additional hole is required to be made outside the gas storing chamber 20. Thus, the cylinder lid 23 may be made thinner, and the manufacturing cost thereof may be reduced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electric nail gun comprising:

a cylinder unit including a striking cylinder that surrounds a first axis and that defines a cylinder chamber, and a cylinder lid that cooperates with the striking cylinder to define a gas storing chamber, the gas storing chamber being adapted for storing gas, and communicating with the cylinder chamber, the cylinder lid including a passage that communicates with the gas storing chamber, the passage extending along a second axis and being at least partially surrounded by the gas storing chamber, the second axis being substantially orthogonal to the first axis;

a nail-striking unit including a piston assembly that extends through the cylinder chamber, that is movable along the first axis, and that is adapted for striking a nail, the piston assembly being able to be driven by pneumatic power and electric power, the gas storing chamber being isolated from an external environment when the nail-striking unit strikes the nail; and a valve unit including a valve assembly that is accommodated in the passage, the valve assembly being operable to convert between a first state, in which the gas is allowed to flow between the gas storing chamber and the external environment through the passage, and a second state, in which the gas is refrained from flowing through the passage;

wherein the cylinder lid has a lid wall that is spaced apart from the striking cylinder in an extending direction of the first axis, a surrounding wall that is connected to the lid wall and that surrounds the first axis, and a passage-defining portion that is formed between the lid wall and the surrounding wall, that surrounds the second axis, and that defines the passage;

wherein the passage has a first hole section that is adjacent to the external environment and that is connected to the surrounding wall, and a second hole section that is located at one side of the first hole section opposite to the external environment and that is surrounded by the gas storing chamber, the valve assembly being mounted to the second hole section; and wherein the valve unit further includes a fitting member, the fitting member being connected to the first hole section, being spaced apart from the valve assembly along the second axis, and cooperating with the valve assembly to define a pressure chamber, the fitting member being adapted to be connected to an gas-filling system, and being capable of guiding gas into the pressure chamber so that the valve assembly is urged by air pressure in the pressure chamber to allow the gas to enter the gas storing chamber through the passage.

2. The electric nail gun as claimed in claim 1, wherein a length of the passage-defining portion along the second axis is less than half of a width of the gas storing chamber along the second axis.

3. The electric nail gun as claimed in claim 1, wherein the valve assembly includes a valve seat that is mounted to the second hole section, a valve rod that extends through the valve seat and that is movable relative to the valve seat in an extending direction of the second axis, and a resilient member that is disposed between the valve seat and the valve rod, the valve rod being operable to move in the extending direction of the second axis between a first position, in which the gas is refrained from passing through the passage, and a second position, in which the gas is allowed to pass through the passage, the resilient member resiliently biasing the valve rod to the first position.

* * * * *